Dec. 7, 1965  G. BONETTI  3,221,552
LIQUID LEVEL INDICATOR
Filed Feb. 19, 1964
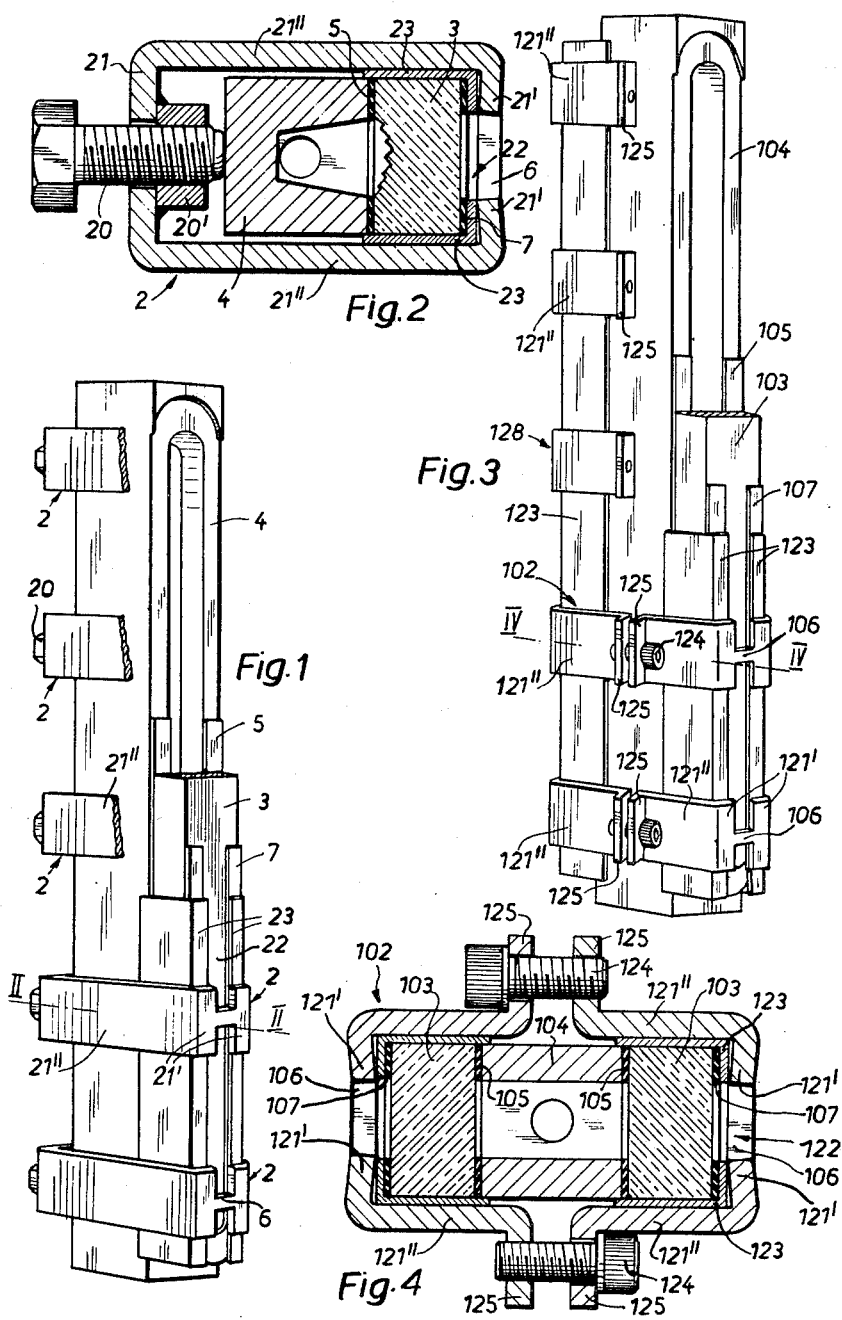

United States Patent Office 3,221,552
Patented Dec. 7, 1965

3,221,552
LIQUID LEVEL INDICATOR
Giulio Bonetti, Milan, Italy, assignor, by mesne assignments, to Istag A.G., Suhr-Aargau, Switzerland
Filed Feb. 19, 1964, Ser. No. 346,018
Claims priority, application Italy, Feb. 22, 1963, 3,777/63
1 Claim. (Cl. 73—330)

The present invention relates to liquid level indicators such as are used, for example, in the steam and chemical industries for pressure tanks. Known indicators comprise at least two longitudinally abutting prismatic parts which together form an outwardly sealed liquid duct adapted to serve as an indicating means, and of which at least one part consists of transparent material, in order to render visible a liquid column in the duct. Conventionally, these prismatic indicator parts are locked together by means of a longitudinally extending casing or the like, which encloses the two elongated prismatic parts and presses them against each other while leaving free an observation slot.

It is an object of the invention to provide an indicator of the above type, which is of simple construction and can be produced without substantial expenditure, particularly for low operating pressures.

A liquid level indicator according to the invention comprises at least two elongated prismatic elements held in contact with each other along one of their longitudinal faces, one of said elements being of transparent material, the two contacting faces defining therebetween a liquid duct adapted to receive the level indicating liquid column, sealing means contacting faces along the liquid duct, and a plurality of clamping members surrounding the contacting elements at longitudinally spaced intervals for clamping the two elements together and holding the two contacting surfaces in tight engagement with one another. The liquid level indicator according to the invention offers the advantage of eliminating the housings hitherto used for compressing the prismatic indicator parts, which housings had to be separately produced for each desired length of indicator. Moreover, the clamping members employed according to the invention can be easily produced and the same type of clamp can be used with any desired observation length, since for different desired lengths it is only necessary to select different numbers of clamps.

Preferably, one of the prismatic indicator parts consists of a glass plate or glass bar and the clamping members are so formed that the engaging point of each tightening clamp on the observation surface of the glass bar will be situated outside of the marginal zone of the bar, preferably at a distance of 7 to 9 mm. from the edge. In this manner the problem is avoided whereby the glass bar splinters off at the marginal portion thereof which defect otherwise may easily occur when a plurality of individual clamps are used which act on the edge of the glass bar. In this manner, moreover, the occurrence of forces is prevented, which tend to spread the clamp apart. Advantageously the correct position of the engaging points of the clamping members is obtained when each tightening clamp abuts against the observing glass surface at an acute angle which opens towards the marginal portion of the glass bar and preferably measures from 2 to 4 degrees.

In order to avoid local excess pressures at the point of attack of the clamping members an intermediate layer preferably is provided between the clamp and the observing glass surface. A particularly advantageous distribution of forces on the glass bar will be obtained when a continuous intermediate layer is provided for each longitudinal edge portion of the bar; when this layer is of angular shape, the associated lateral face of the glass plate will also be covered and thus protected.

The tensioning force, required for compressing the prismatic indicator parts by means of clamps, can be obtained by means of a spline or wedge connection, or the like. It is of advantage, however, to apply the clamping pressure by means of screws. For this purpose, each tightening clamp at the side of the glass bar holder remote from the glass bar is provided with a screw thread into which a pressure screw engages, which abuts against the glass bar holder. The clamping members in that zone of the glass bar, where the liquid level is read, may be either open or the two branches of the clamp are interconnected by a small web not impeding the observation of the level.

The present invention will now be described in more detail with reference to the accompanying drawings illustrating, by way of example, two embodiments of the invention, and in which:

FIGURE 1 is a reflection indicator in perspective view,
FIGURE 2 is a section along line II—II of FIG. 1,
FIGURE 3 is a perspective view of a transparent indicator having two glass plates and
FIGURE 4 is a sectional view along line IV—IV of FIGURE 3.

Referring more particularly to FIGURES 1 and 2 of the drawings, an observation glass 3 and a glass retainer 4, as well as an interposed packing 5 of a reflection liquid indicator are tightened together by a plurality of clamps 2 which are regularly spaced apart from each other over the entire length of the indicator and enclose the glass 3 and also the glass retainer 4, with the exception of the reading zone 22. The clamping force necessary for tightening together the two indicator parts, is obtained in each clamp by means of a pressure screw 20 acting upon that face of the glass retainer which is remote of the glass plate, the screw 20 being adjustably engaged in a screw thread which is fixed with respect to the clamp 2, for example in a nut 20' welded to the clamp. Each clamp is open at the side of observation and includes parallel lateral portions 21" having bent over end portions 21'. The bending angle is somewhat less than 90 degrees, so that the tightening clamps abut only with their two opposite end portions against the glass 3. In this manner the tightening forces exerted by by the ends 21' do not engage at the edge of the glass but further inwardly of the edge at a distance of about 7 to 9 millimeters away from the edge, so that the risk of splintering particles from the glass is largely avoided, in spite of a possible nonuniform action of the tightening force. Also in the case of smaller size indicators requiring a moderate clamping force, the clamp is safely prevented from spreading apart. When greater clamping forces are required, the two clamp ends 21' suitably are interconnected by a small web 6 which does not obstruct the sight. In this case however, the clamp will be bent so that the action of the clamping force is not exerted on the marginal portion of the glass, but towards the middle thereof, thus at the ends of the web. For a better distribution of the tightening forces which, owing to the clamps, only act at spaced intervals, intermediate layers or angles 23 of right angular cross-section are provided and cover the glass also on the sides. The tightening forces exerted by the clamps 2 are distributed by this intermediate layer and transmitted onto the glass by means of a further intermediate soft sheet or protective strip 7. Despite the provision of individual spaced clamps of very simple manufacture a glass fracture will be safely avoided. Thus, even with different operative stresses and with different indicator lengths, it is possible to always use the same type of clamps which can be suitably spaced over the length of the indicator according to the particular case.

The type of indicator construction according to FIGURES 3 and 4 comprises two glasses 103 provided with smooth surfaces and which are clamped together with a glass retainer or spacer member 104 and interposed packings 105. The glass retainer 104 is provided with a continuous slot and together with the two glasses 103 forms a liquid duct in which a liquid column is visible when the front face of the glass is looked at. Each clamp 102 consists of a pair of clamping members 128 bent in the form of a U, the bent off opposite ends 125 of which are connected together by means of screws 124. The clamping members 128 are of identical construction, so that a screw head is directed towards each side of the indicator. The clamping members are also bent in such a manner that the sections 121' and 121" form an angle of less than 90 degrees, thus relieving the glass edges from being acted upon by any clamp tensioning forces.

The portion of the clamping members 128 traversing the reading zone of the two glasses 103 are formed as narrow webs 106 which do not obstruct the sight. Also in this case intermediate layers 123 are provided, which in cooperation with the soft washers 107 insure a perfect and uniform pressure transmission onto the glasses.

I claim:

A liquid level indicator comprising two elongated prismatic elements, a packing, said elements sandwiching said packing therebetween and forming a unit defining a sealed liquid duct constituting a visual indicator, one of said elements having an observation surface bounded by two lateral surfaces, soft protective strips marginally covering said observation surface, angle members including first and second sections respectively covering said strips and extending flatly along said lateral surfaces, said angle members extending past said packing onto the other of said elements, a plurality of separate clamps spaced along and encircling said unit, said clamps each including lateral portions extending along said lateral surfaces and end portions connected to the lateral portions at an acute angle and engaging against the first sections of the angle members at positions spaced inwardly of the lateral surfaces of said one element, said clamps each further including a web connecting the related end portions and of substantially lesser width than the same; and screws extending through the clamps and engaging said other element to hold said elements and packing together.

References Cited by the Examiner

UNITED STATES PATENTS

| 1,013,809 | 1/1912 | Panhorst | 73—330 |
| 1,126,226 | 1/1915 | Kassander | 73—330 |
| 1,202,511 | 10/1916 | Groff | 73—330 |
| 1,275,927 | 8/1918 | Huntress et al. | 73—330 |
| 2,050,207 | 8/1936 | Corey | 73—330 |
| 2,191,722 | 2/1940 | Mulloy et al. | 73—330 |
| 2,314,761 | 3/1943 | Bochonok | 73—330 |

FOREIGN PATENTS 555,008   7/1932   Germany.

ISAAC LISANN, *Primary Examiner.*